United States Patent

Poplawski

[11] Patent Number: 5,817,375
[45] Date of Patent: Oct. 6, 1998

[54] PROCESS FOR IMPROVING THE PERFORMANCE AND EXTENDING THE LIFE OF RAILROAD CAR BRAKE ASSEMBLY COMPONENTS

[75] Inventor: Edward Joseph Poplawski, Beaver Falls, Pa.

[73] Assignee: E.J.P. Machine, Inc., Monaca, Pa.

[21] Appl. No.: 825,928

[22] Filed: Apr. 7, 1997

[51] Int. Cl.$^6$ ................................................. B05D 1/06
[52] U.S. Cl. .................. 427/475; 427/485; 427/486; 427/476; 427/421
[58] Field of Search ................................. 427/475, 485, 427/486, 195, 421, 181, 476, 459, 180, 182, 372.2, 435; 188/73.1

[56] References Cited

U.S. PATENT DOCUMENTS

| | | | |
|---|---|---|---|
| 4,069,974 | 1/1978 | Zawachi | 239/15 |
| 4,481,239 | 11/1984 | Eckner | 428/36 |
| 5,236,528 | 8/1993 | Nakagawa | 156/153 |
| 5,281,481 | 1/1994 | Hayward | 428/416 |
| 5,622,785 | 4/1997 | Gaylor et al. | 428/525 |

Primary Examiner—Shrive Beck
Assistant Examiner—Fred J. Parker

[57] ABSTRACT

A process for improving the performance and extending the life of railroad brake assemblies includes coating the components of the brake assembly with a powder. The powder coating may include an epoxy, a polyester or combinations thereof. After the selected components of the railroad car brake assembly are sprayed with the powder, the components are heated in an oven for curing the powder to form a coating on the components. The components of the railroad car brake assembly which may be coated include a cylinder body, a lock plug, a push rod end, a piston body, and a release spring. The powder coating of the railroad car brake assembly reduces corrosion, reduces abrasion, maintains slippage due to reduced friction, and reduces the amount of repairs and replacement of the railroad car brakes.

20 Claims, 3 Drawing Sheets

PROCESS FOR IMPROVING THE PERFORMANCE AND EXTENDING THE LIFE OF RAILROAD CAR BRAKE ASSEMBLY COMPONENTS

BACKGROUND OF THE INVENTION

The invention relates to powder coating and, more particularly, to the coating of railroad car brake assembly components.

Powder coating is used in various industries as a finishing technology for producing a high quality and durable finish while maximizing production, reducing costs, improving efficiency, and complying with environmental regulations. Powder coating is currently used on products such as appliances, building materials, electrical components, and furniture.

A railroad car has brake assemblies for controlling the speed of the railroad car along the railroad tracks. Each brake assembly of the railroad car includes numerous components which cooperatively work together, and are formed of various materials, such as cast iron, cast steel, aluminum and spring steel. After extended periods of use, such as the extensive miles traveled by a railroad car, the components of the railroad car brake tend to show wear, corrosion, abrasion or the like, requiring repair or replacement of some of the components of the railroad car brake or the entire railroad car brake assembly.

Currently, the piston tube is anodized. However, when the piston tube is subjected to certain conditions, such as salt or ultraviolet light, the anodized coating tends to break down.

Therefore, what is needed is a method for improving the performance and extending the life of the railroad car brake assembly which involves coating components of the railroad car brake assembly with a powder coating.

SUMMARY OF THE INVENTION

A process for improving the performance and extending the life of a railroad car brake assembly includes the steps of coating at least one component of the railroad car brake assembly with a powder, and heating the component of the railroad car brake assembly coated with the powder for a sufficient period of time at a particular temperature for melting and fusing the powder into a coating disposed on the railroad car brake assembly component.

The components of the railroad car brake assembly which may be powder coated include a cylinder body, a lock plug, a push rod end, a piston body, and a release spring. The powder may include a polyester, an epoxy or combinations thereof The step of coating includes electrostatically charging particles of the powder, electrically grounding the railroad car brake assembly component for enabling the electrostatically charged particles of the powder to adhere to the railroad car brake assembly component, and spraying the electrostatically charged particles of the powder onto the electrically grounded railroad car brake assembly component for coating the railroad car brake assembly component with the powder.

BRIEF DESCRIPTION OF THE DRAWINGS

While the specification concludes with claims particularly pointing out and distinctly claiming the subject matter of the invention, it is believed the invention will be better understood from the following description, taken in conjunction with the accompanying drawings, wherein:

DESCRIPTION OF THE PREFERRED EMBODIMENT

The invention described herein provides a method for improving the performance and extending the life of railroad car brake assemblies.

To improve the performance of the railroad car brake, at least one or several of the components of the brake assembly is coated with a powder coating. By coating the components of the railroad car brake assembly, the railroad car brake has improved wear qualities. The powder coating improves the performance of the railroad car brake by maintaining slippage due to less friction and by resisting corrosion, abrasion, heat and impact.

The coating which is applied to the components of the railroad car brake assembly is a powder which includes finely ground particles of pigment and resin. The powder may be a polyester, an epoxy, combinations thereof, or the like. Additionally, the powder may include anti-gasing agents, curing agents, catalysts, fillers, colorants, flow-control agents, ultraviolet light resistant agents, or any other suitable component.

Preferably, the powder used is a low-curing temperature hybrid of the thermoplastic powder coating and provides a thin-layer coating. The powder melts when subjected to heat and solidifies when cooled. The powder undergoes an irreversible chemical change during the curing process and does not soften back to the liquid phase when reheated. As an example, the thickness of the coating may be approximately 2 to 4 mils.

To apply the powder coating, the powder is electrostatically charged and sprayed onto a part to be coated.. The coating process can be performed manually or automatically. The components or parts of the railroad car brake assembly that are coated are electrically grounded so that the charged powder particles projected at the parts adhere to the parts and are held there until melted and fused into a smooth coating in a curing oven. As an example, the components can be cured at approximately 400° for approximately 30 minutes to fusion bond the material.

Prior to the application of the powder coating, the components to be coated are cleaned and inspected. The cleaning may include chemical cleaning, blast cleaning with abrasives, or the like for removing oil, grease, tar, rust, or other contaminants. The components are inspected for adequate cleaning and for surface imperfections, such as burrs, slivers, gouges, or the like which should be repaired prior to coating for preventing the formation of holidays in the coating. The components can be cooled after the curing process with air or water spray to a temperature below 200° Fahrenheit (93° Celsius) for handling of the parts.

Figure 1:
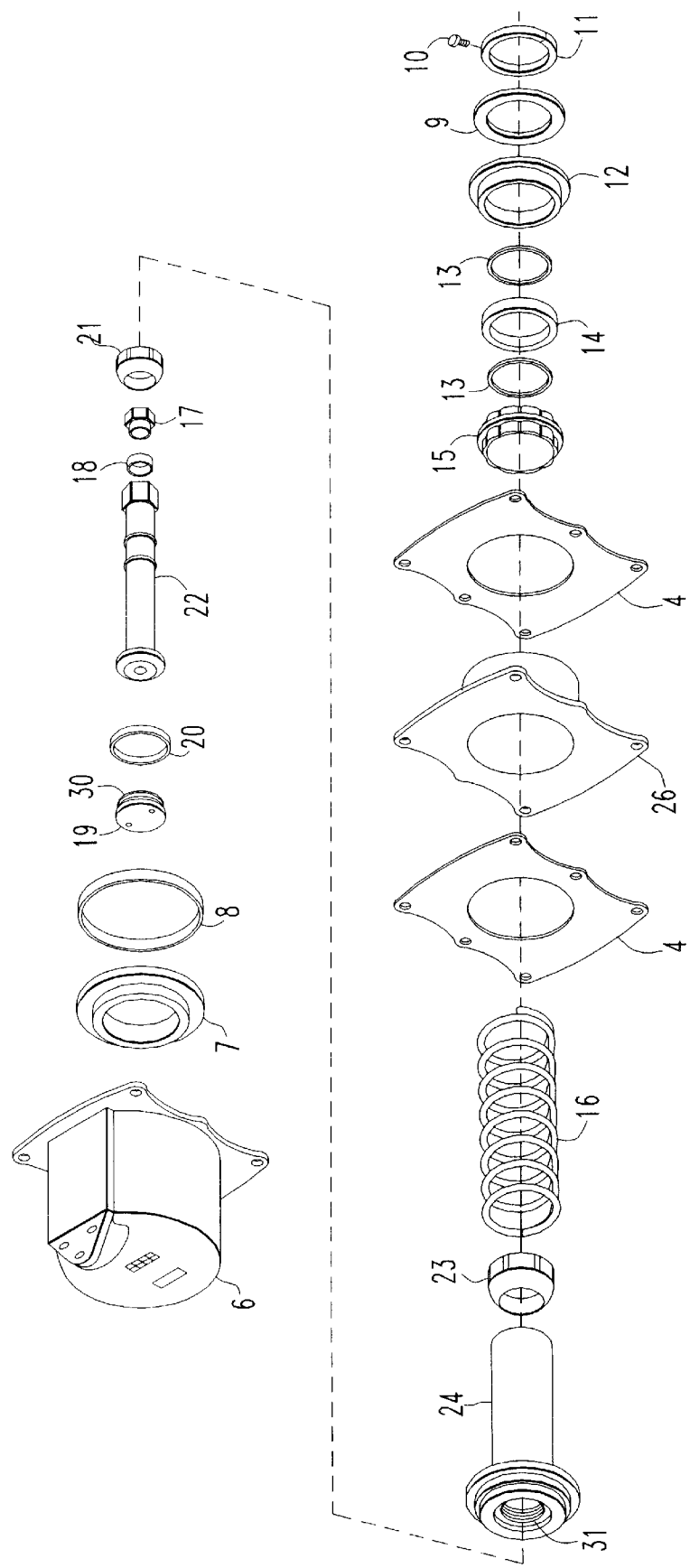
FIG. 1 is an exploded view of a railroad car brake assembly.
Figure 2:
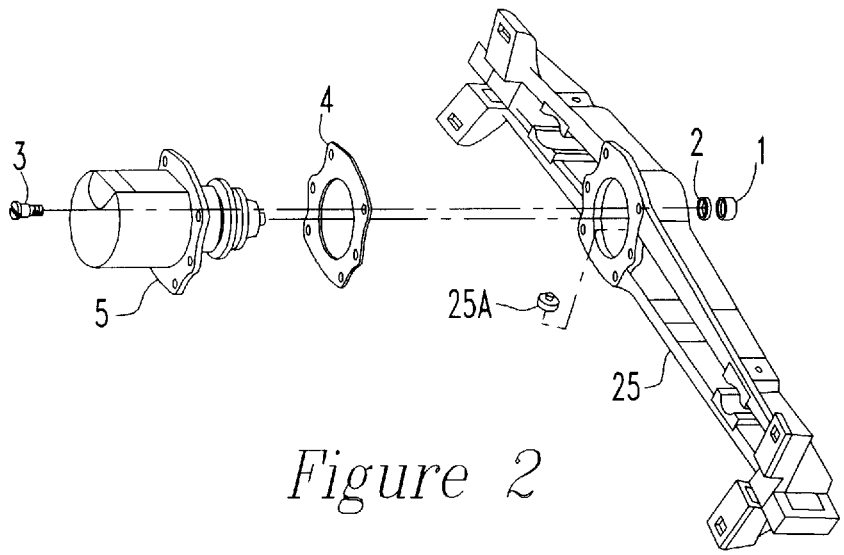
FIG. 2 is a partial exploded view of the railroad car brake assembly of FIG. 1.

Referring to FIGS. 1 and 2, a railroad car brake assembly of a railroad car includes the following components: a nut 1, a washer 2, a bolt 3, a gasket 4, a cylinder with piston and push rod end assembly 5, a cylinder body 6, a packing cup 7, a piston head ring guide 8, a hollow rod guide gasket 9, a self-locking set screw 10, a push rod holder 11, a hollow rod guide 12, an O-ring 13, a hollow rod packing seal 14, a ring seat 15, a release spring 16, a locking nut 17, a push rod seal 18, a lock plug 19, a lock ring 20, an anti-rattler ring 21, a push rod end 22, a push rod end seal 23, a piston body 24, a beam 25, a strainer 25A, and a spring seat stop 26. FIGS. 1 and 2 are illustrative of a brake assembly manufactured by WABCO and may be made in a 7½ inch and an 8½ inch size, which refers to the diameter of the piston, The lock plug 19 has threads 30 and the piston body 24 has threads 31. Preferably, the threads 30 of the lock plug 19 are masked, such as with tape or the like, so that the threads are not coated. Other sections of the components of the brake may also be masked for coating only specific areas of the brake assembly components as desired.

The nut 1 engages the bolt 3 to hold the cylinder 6 with the piston and push rod end assembly 5, interspaced with the gasket 4, against the beam 25. The locking nut 17 retains one end of the rod 22 and engages the ring 21, and the lock ring 20 engages an opposite end of the rod 22. The packing cup 7 is disposed within the cylinder 6. The moving parts, such as the push rod 22 and the piston 24 within the cylinder 6, the plug 19 and the spring 16 interact together and cooperate among one another to control the speed of the railroad car. Various other components act as seals or gaskets to absorb impact, restrict the flow of fluid or other similar function, such as the gasket 9, the O-ring 13, the seals 14, 18, and 23. The guides 8 and 12, the seat 15, the stop 26 and the holder 11 control movement of the components.

For the various embodiments of this invention, the same reference characters will be used to designate like parts. In addition, like functions and like interactions of the parts among the various embodiments of this invention will not be repeated for each embodiment.

Figure 4:
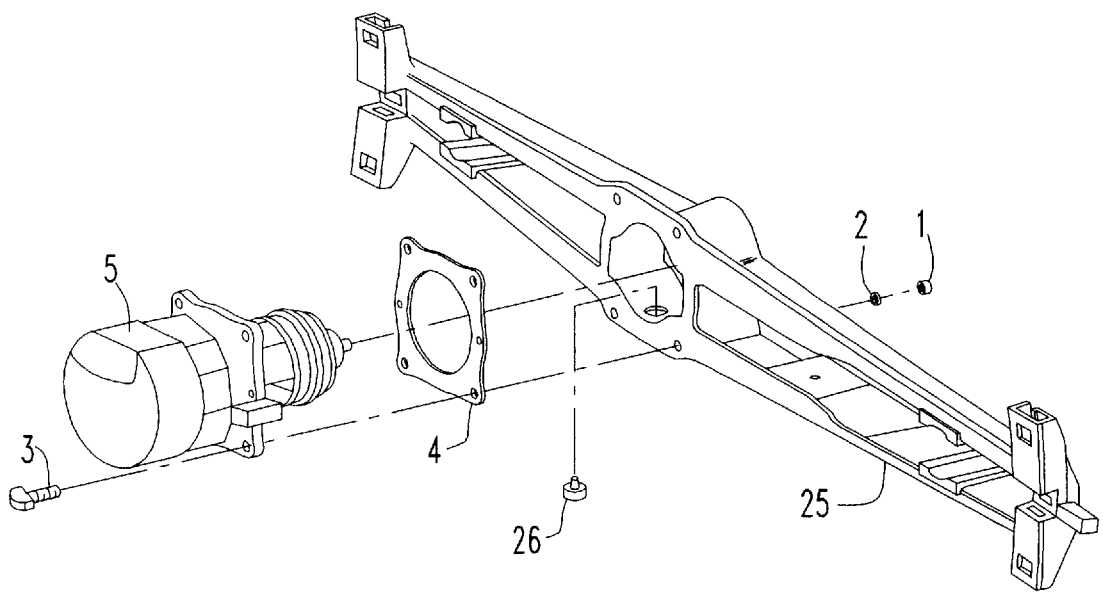
FIG. 4 is a partial exploded view of the railroad car brake assembly of FIG. 3.
Figure 3:
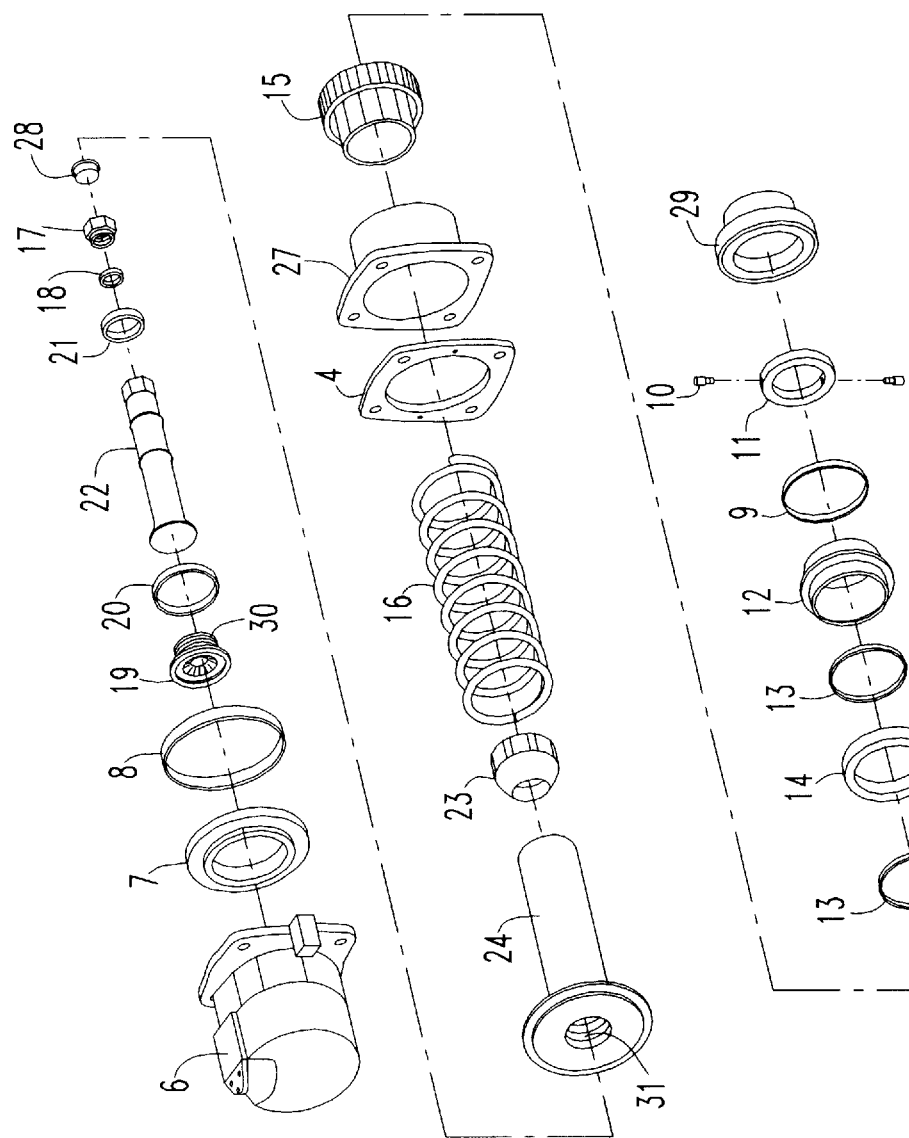
FIG. 3 is an exploded view of an alternative embodiment of the railroad car brake assembly.

Referring to FIGS. 3 and 4 and using the same reference characters to define like parts, an alternative embodiment of the railroad car brake assembly as illustrated in FIGS. 1 and 2 may be a railroad car brake assembly manufactured by New York Air Brake (NYAB) having like parts as the WABCO brake assembly and additionally having a thread protector 28 and a shipping cover 29. Like the WABCO brake illustrated in FIGS. 1 and 2. New York Air Brake also manufactures an air brake in a 7½ inch and an 8½ inch size.

The following tables illustrate examples of railroad car brake assembly components which may be powder coated:

TABLE 1

7 ½ inch WABCO Brake Assembly Components

| Reference No. | Component Name | Part No. | Drawing No. |
| --- | --- | --- | --- |
| 6 | Cylinder Body | 566009 | 22037350 |
| 16 | Release Spring | 562963 | 22808701 |
| 19 | Lock Plug | 567398 | 22579302 |
| 22 | Push Rod End | 562950 | |
| 24 | Piston Body | 567401 | |

TABLE 2

8 ½ inch WABCO Brake Assembly Components

| Reference No. | Component Name | Part No. | Drawing No. |
| --- | --- | --- | --- |
| 6 | Cylinder Body | 566251 | 22037368 |
| 16 | Release Spring | 562963 | 22808701 |
| 19 | Lock Plug | 567398 | 22579302 |
| 22 | Push Rod End | 562960 | |
| 24 | Piston Body | 567402 | 22043713 |

TABLE 3

7 ½ inch NYAB Brake Assembly Components

| Reference No. | Component Name | Part No. | Drawing No. |
| --- | --- | --- | --- |
| 6 | Cylinder Body | 566009 | TB-176 |
| 16 | Release Spring | 562963 | TB-138 |
| 19 | Lock Plug | 760742 | 760742 |
| 22 | Push Rod End | 562960 | TB-154 |
| 24 | Piston Body | 567401 | TB-177-C |

TABLE 4

8 ½ inch NYAB Brake Assembly Components

| Reference No. | Component Name | Part No. | Drawing No. |
| --- | --- | --- | --- |
| 6 | Cylinder Body | 566251 | TB-191 |
| 16 | Release Spring | 562963 | TB-138 |
| 19 | Lock Plug | 760742 | 760742 |
| 22 | Push Rod End | 562960 | TB-154 |
| 24 | Piston Body | 567402 | TB-190-C |

Additionally, other components of the railroad car brake assembly may also Be powder coated for improving the performance and extending the life of the brake. Also, the powder coating process may be used on any type and size of railroad car Brake assembly or other manufacturer of brake assemblies, such as Triax.

Typically, the cylinder body is formed of cast iron, the lock plug is formed of cast steel, the push rod end is formed of cast steel, the piston body is formed of aluminum, and the release spring is formed of spring steel.

An advantage of the use of the powder coating is that the coated railroad car brake assemblies have improved performance enabling the brakes to be used longer and for extended mileage between replacement or repair, as compared to brakes that have not been coated. The powder coated brake assemblies can be serviced more efficiently, providing a time-saving advantage over brake assemblies which are not powder coated.

The powder coating increases the performance of the brake by increasing the hardness of the railroad car brake assemblies by maintaining slippage among the components of the brake due to reduced friction, and by reducing corrosion and abrasion. The powder coated railroad car brake assemblies also have increased performance due to a reduction in wear and increased resistance to impact.

Several of the components of the railroad brake assembly need to be replaced more often than other components of the brake due to corrosion, wear, etc. By coating these components, the life of the brake can be increased.

Thus there has been shown and described a novel process for improving the performance of railroad car brake assembly components which fulfills all the objects and advantages sought therefor. Many changes, modifications, variations and other uses and applications of the subject invention will, however, become apparent to those skilled in the art after considering this specification together with the accompanying drawings and claims. All such changes, modifications, variations and other uses and applications which do not depart from the spirit and scope of the invention are deemed to be covered by the invention which is limited only by the claims which follow.

I claim:

1. A process for improving the performance and extending the life of a railroad car air brake cylinder assembly of railroad car, comprising the steps of:

coating at least one working component of said railroad car air brake cylinder assembly of said railroad car with a powder; and heating said component of said railroad car air brake cylinder assembly of said railroad car coated with said powder for a sufficient period of time to a temperature sufficient for melting and fusing said powder into a coating disposed on said railroad car air brake cylinder assembly component.

2. The process according to claim 1, wherein said component is a cylinder body of said railroad car air brake cylinder assembly.

3. The process according to claim 1, wherein said component is a lock plug of said railroad car air brake cylinder assembly.

4. The process according to claim 1, wherein said component is a push rod end of said railroad car air brake cylinder assembly.

5. The process according to claim 1, wherein said component is a piston body of said railroad car air brake cylinder assembly.

6. The process according to claim 1, wherein said component is a release spring of said railroad car air brake cylinder assembly.

7. The process according to claim 1, further comprising the steps of:

electrostatically charging particles of said powder;

electrically grounding said railroad car air brake cylinder assembly component for enabling said electrostatically charged particles of said powder to adhere to said railroad car air brake cylinder assembly component; and spraying said electrostatically charged particles of said powder onto said electrically grounded railroad car air brake cylinder assembly component for coating said railroad car air brake cylinder assembly component with said powder.

8. The process according to claim 1, wherein said powder includes a polyester.

9. The process according to claim 1, wherein said powder includes an epoxy.

10. A process for improving the performance and extending the life of a railroad car brake assembly of a railroad car, comprising the steps of:

coating a cylinder body of said railroad car brake assembly of said railroad car with a powder;

coating a lock plug of said railroad car brake assembly of said railroad car with a powder;

coating a push rod end of said railroad car brake assembly of said railroad car with a powder;

coating a piston body of said railroad car brake assembly of said railroad car with a powder;

coating a release spring of said railroad car brake assembly of said railroad car with a powder;

heating said cylinder body, said lock plug, said push rod end, said piston body, and said release spring coated with said powder for a sufficient period of time to a temperature sufficient for curing said powder.

11. The process according to claim 10, wherein said powder includes a polyester.

12. The process according to claim 10, wherein said powder includes an epoxy.

13. A process for improving the performance and extending the life of a railroad car brake assembly of a railroad car, comprising the steps of:

electrostatically charging particles of a powder;

electrically grounding a working component of said railroad car brake assembly of said railroad car for enabling said electrostatically charged particles of said powder to adhere to said railroad car brake assembly component;

spraying said electrostatically charged particles of said powder onto said electrically grounded railroad car brake assembly component of said railroad car for coating said railroad car brake assembly component with said powder; and heating said component for a sufficient period of time to a temperature sufficient for melting and fusing said powder into a coating disposed on said railroad car brake assembly component.

14. The process according to claim 13, wherein said component of said railroad car brake assembly is a cylinder.

15. The process according to claim 13, wherein said component of said railroad car brake assembly is a plug.

16. The process according to claim 13, wherein said component of said railroad car brake assembly is a rod.

17. The process according to claim 13, wherein said component of said railroad car brake assembly is a piston.

18. The process according to claim 13, wherein said component of said railroad car brake assembly is a spring.

19. The process according to claim 13, wherein said powder includes a polyester.

20. The process according to claim 13, wherein said powder includes an epoxy.

* * * * *